United States Patent
Dupey et al.

(10) Patent No.: US 10,922,320 B2
(45) Date of Patent: Feb. 16, 2021

(54) SYSTEM AND METHOD FOR ANONYMIZING ADDRESS DATA

(71) Applicant: SAP SE, Walldorf (DE)

(72) Inventors: Ronald Dupey, Onalaska, WI (US); Peter M McDonald, Onalaska, WI (US)

(73) Assignee: SAP SE, Walldorf (DE)

( * ) Notice: Subject to any disclaimer, the term of this patent is extended or adjusted under 35 U.S.C. 154(b) by 320 days.

(21) Appl. No.: 15/900,776

(22) Filed: Feb. 20, 2018

(65) Prior Publication Data
US 2019/0258735 A1 Aug. 22, 2019

(51) Int. Cl.
*G06F 16/2457* (2019.01)
*G06F 16/29* (2019.01)

(52) U.S. Cl.
CPC ........ *G06F 16/24575* (2019.01); *G06F 16/29* (2019.01)

(58) Field of Classification Search
CPC ............................ G06F 16/24575; G06F 16/29
See application file for complete search history.

(56) References Cited

U.S. PATENT DOCUMENTS

| | | | |
|---|---|---|---|
| 8,326,849 B2 | 12/2012 | El Emam et al. | |
| 8,386,333 B2 | 2/2013 | Sonderegger et al. | |
| 8,627,483 B2 | 1/2014 | Rachlin et al. | |
| 2004/0019698 A1 | 1/2004 | Najafi | |
| 2004/0181670 A1* | 9/2004 | Thune | G06F 21/6263 713/176 |
| 2005/0171691 A1* | 8/2005 | Smartt | G01C 21/3605 701/426 |
| 2008/0140311 A1* | 6/2008 | Searight | G06F 16/29 701/520 |
| 2009/0047972 A1* | 2/2009 | Neeraj | G06Q 10/10 455/456.1 |
| 2009/0070196 A1* | 3/2009 | Shaffer | G06Q 10/10 705/7.32 |
| 2012/0150433 A1* | 6/2012 | Hulubei | G06F 16/29 701/437 |
| 2013/0130709 A1* | 5/2013 | Voronel | G01C 21/3667 455/456.1 |
| 2013/0332238 A1* | 12/2013 | Lyle | G06Q 30/0201 705/7.34 |
| 2014/0059355 A1 | 2/2014 | Schuette et al. | |
| 2014/0280261 A1* | 9/2014 | Butler | G06F 21/6254 707/756 |
| 2014/0372334 A1* | 12/2014 | Wrentmore | G06Q 10/083 705/330 |
| 2016/0217461 A1 | 7/2016 | Gaddam et al. | |
| 2016/0379214 A1 | 12/2016 | Li et al. | |
| 2017/0131106 A1 | 5/2017 | Dupey et al. | |
| 2017/0169249 A1 | 6/2017 | De Oliveira et al. | |

* cited by examiner

*Primary Examiner* — Jensen Hu
(74) *Attorney, Agent, or Firm* — Fountainhead Law Group P.C.

(57) ABSTRACT

Some embodiments provide a non-transitory machine-readable medium that stores a program. The program receives a first set of address data that describes a first geographic location. The program further determines a first set of geo-location coordinates based on the first set of address data. The program also determines a second set of geo-location coordinates based on the first set of geo-location coordinates. The program further determines a second set of address data based on the second set of geo-location coordinates.

20 Claims, 10 Drawing Sheets

SYSTEM AND METHOD FOR ANONYMIZING ADDRESS DATA

BACKGROUND

Nowadays, an increasing number of tasks and transactions are handled electronically. Thus, there is a need to protect sensitive information that is transmitted and stored electronically. Many computing systems and software applications include data anonymization features for protecting personally identifying information by representing such information in a way that is different but still discernable as to what kind of data it is. This feature is commonly employed in electronic processes that require data to be similar to the source data for the purpose of data analysis, research, or any other processes that makes data available for public access.

SUMMARY

In some embodiments, a non-transitory machine-readable medium stores a program. The program receives a first set of address data that describes a first geographic location. The program further determines a first set of geo-location coordinates based on the first set of address data. The program also determines a second set of geo-location coordinates based on the first set of geo-location coordinates. The program further determines a second set of address data based on the second set of geo-location coordinates.

In some embodiments, the program may further determine a population class associated with the first set of address data. Determining the population class associated with the first set of address data may include identifying a table of mappings between a plurality of population classes and a plurality of population ranges. Determining the population class associated with the first set of address data may be based on the table of mappings. The program may further determine a distance value based on the population class associated with the first set of address data. Determining the second set of geo-location coordinates may be further based on the distance. Determining the distance value may include identifying a table of mappings between a plurality of population classes and a plurality of maximum distance values and determining the minimum distance value is based on the maximum distance value; and randomly selecting a number between the minimum distance value and the maximum distance value as the distance value.

In some embodiments, the program may further determine an angle. Determining the second set of geo-location coordinates may be further based on the angle. Determining the second set of address data may include performing a set of reverse geocoding operations to identify a set of address data that describes a geographic location nearest to the second set of geo-location coordinates as the second set of address data.

In some embodiments, a method receives a first set of address data that describes a first geographic location. The method further determines a first set of geo-location coordinates based on the first set of address data. The method also determines a second set of geo-location coordinates based on the first set of geo-location coordinates. The method further determines a second set of address data based on the second set of geo-location coordinates.

In some embodiments, the method may further determine a population class associated with the first set of address data. Determining the population class associated with the first set of address data may include identifying a table of mappings between a plurality of population classes and a plurality of population ranges. Determining the population class associated with the first set of address data may be based on the table of mappings. The method may further determine a distance value based on the population class associated with the first set of address data. Determining the second set of geo-location coordinates may be further based on the distance. Determining the distance value may include identifying a table of mappings between a plurality of population classes and a plurality of maximum distance values and determining the minimum distance value is based on the maximum distance value;

and randomly selecting a number between the minimum distance value and the maximum distance value as the distance value.

In some embodiments, the method may further determine an angle. Determining the second set of geo-location coordinates may be further based on the angle. Determining the second set of address data may include performing a set of reverse geocoding operations to identify a set of address data that describes a geographic location nearest to the second set of geo-location coordinates as the second set of address data.

In some embodiments, a system includes a set of processing units and a non-transitory machine-readable medium that stores instructions. The instructions cause at least one processing unit to receive a first set of address data that describes a first geographic location. The instructions further cause the at least one processing unit to determine a first set of geo-location coordinates based on the first set of address data. The instructions also cause the at least one processing unit to determine a second set of geo-location coordinates based on the first set of geo-location coordinates. The instructions cause the at least one processing unit to determine a second set of address data based on the second set of geo-location coordinates.

In some embodiments, the instructions may further cause the at least one processing unit to determine a population class associated with the first set of address data. Determining the population class associated with the first set of address data may include identifying a table of mappings between a plurality of population classes and a plurality of population ranges. Determining the population class associated with the first set of address data may be based on the table of mappings. The instructions may further cause the at least one processing unit to determine a distance value based on the population class associated with the first set of address data. Determining the second set of geo-location coordinates may be further based on the distance. Determining the distance value may include identifying a table of mappings between a plurality of population classes and a plurality of maximum distance values and determining the minimum distance value is based on the maximum distance value;

and randomly selecting a number between the minimum distance value and the maximum distance value as the distance value.

In some embodiments, the instructions further cause the at least one processing unit to determine an angle. Determining the second set of geo-location coordinates may be further based on the angle.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for anonymizing address data. In some embodiments, such address data anonymization techniques are implemented by a system that includes an application and a data processing system. The data processing system may receive from the application an original address and a request to anonymize the original address. In some embodiments, the system anonymizes the original address (also referred to as the real address) by determining another address (also referred to as the anonymized address) that describes another location near the location described by the original address. In some embodiments, the system determines the anonymized address by randomly determining a distance and angle, determining a location located at the determined distance and angle from the original address, and then determining an address nearest the location as the anonymized address.

The techniques described in the present application provide a number of benefits and advantages over conventional data anonymization methodologies. For example, a system that uses the address data anonymization techniques described herein successfully anonymizes address data without revealing the real address data. Additionally, such techniques produce anonymized address data that includes real and valid addresses that are a reasonably close distance to the original address data thereby preserving the integrity of the real address data, maintaining the usefulness of anonymized address data, and allowing any downstream processes relying on valid address data to function properly.

Figure 1:
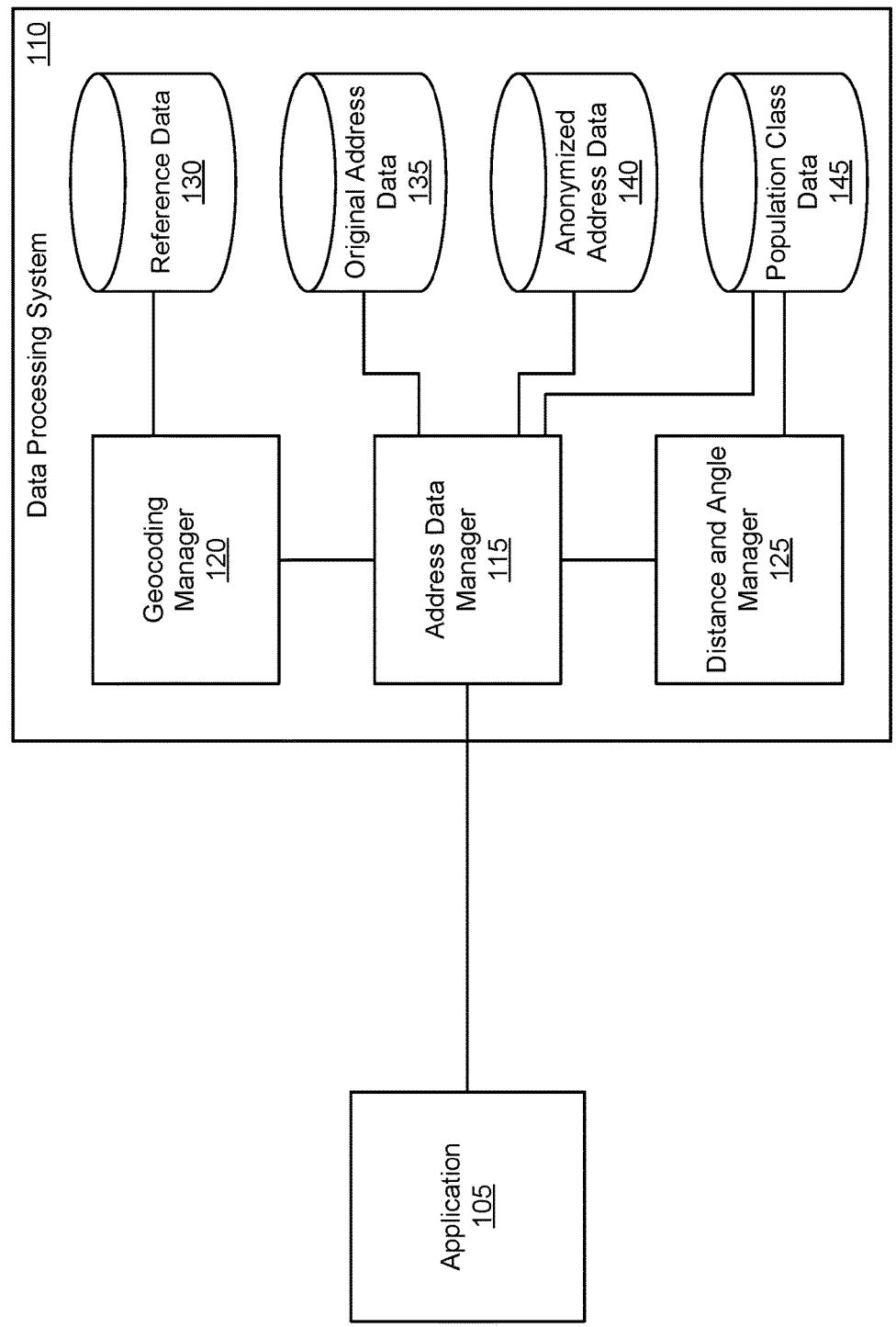
FIG. 1 illustrates a system for anonymizing address data according to some embodiments.

FIG. 1 illustrates a system 100 for anonymizing address data according to some embodiments. As shown, system 100 includes application 105 and data processing system 110. Application 105 is configured to communicate and interact with data processing system 110. For instance, application 105 may send data processing system 110 a set of original address data along with a request to anonymize the set of original address data. Alternatively, application 105 can send data processing system 110 a request to anonymize a set of original address data stored in original address data storage 135. In response to either such requests, application 105 can receive a set of anonymized address data in some cases. In other cases, application 150 may receive a notification indicating that the set of original address data has been anonymized and can access the set of anonymized address data associated with the set of original address data from data processing system 110.

Application 105 may be any number of different types of applications. For instance, application 105 may be an analytics application, a data management application, a database management application, a human capital management application, an enterprise management application, a customer relationship management application, a financial management application, etc. In some embodiments, application 105 is a software application operating on a client device (not shown). In other embodiments, application 105 is part of data processing system 110. In some such other embodiments, application 105 and data processing system 110 are implemented on the same computing device or set of computing devices. In other such other embodiments, data processing system 110 may be a cloud computing system and application 105 may be a cloud application.

As illustrated in FIG. 1, data processing system 110 includes address data manager 115, geocoding manager 120, distance and angle manager 125, and storage 130-145. Reference data storage 130 is configured to store reference data for geocoding and reverse geocoding purposes. In some embodiments, reference data may include a set of addresses. Each address may include a house number, a street name, a street type, a street direction, a city, a subcity, a region, a postcode, etc. Each address can have corresponding latitude and longitude coordinates representing the location of the address as well as other location attributes. In some embodiments, the population class associated with each address is also stored in reference data storage 130. Original address data storage 135 stores original (or real) address data. Address data may include any number of different data attributes for describing a geographical location of a structure (e.g., a building, a house, an apartment, a condo, an office, etc.) or plot of land. Examples of address data attributes include street/house number, street, city, county, state, province, country, zip code, etc. Anonymized address data storage 140 is configured to store anonymized address data (e.g., anonymized original address data stored in original address data storage 135). Population class data storage 145 may store population class information. For instance, population class data storage 145 may store census data for different types of geographical regions (e.g., towns, cities, counties, states, provinces, countries, etc.), tables of mappings between population classes and ranges of population values for different types of geographical regions, tables of mappings between population classes and maximum distance values, etc. In some embodiments, a population class is a unique identifier that represents a particular range of population numbers. In some embodiments, storages 130-145 are implemented in a single physical storage while, in other embodiments, storages 130-145 may be implemented across several physical storages. While FIG. 1 shows storages 130-145 as part of data processing system 110, one of ordinary skill in the art will appreciate that storages 130, 135, 140, and/or 145 may be external to data processing system 110 in some embodiments.

Address data manager 115 is responsible for managing the anonymization of address data. For example, address data manager 115 may receive from application 105 a set of original address data and a request to anonymize the set of original address data. In some instances, address data manager 115 receives from application 105 a request to anonymize a set of original address data stored in original address data storage 135. In such instances, address data manager 115 retrieves the set of original address data from original address data storage 135.

To anonymize the set of original address data, address data manager 115 sends geocoding manager 120 the set of original address data and a request to determine a set of geo-location coordinates (e.g., latitude and longitude) associated with the set of original address data. Upon receiving the set of geo-location coordinates associated with the set of original address data from geocoding manager 120, address data manager 115 next determines a population class associated with the set of original address data. As mentioned above, population class data storage 145 may store census data for different types of geographical regions (e.g., towns, cities, counties, states, provinces, countries, etc.) and tables of mappings between population classes and ranges of population values for different types of geographical regions. In some embodiments, address data manager 115 determines the population class associated with the set of original address data by accessing population class data storage 145 and identifying the census data for a particular type of geographical region described in the set of original address data. Different embodiments utilize different types of geographical regions. For example, in some cases where the set of original address data includes a city attribute, address data manager 115 may use a city as the particular type of geographical region and, thus, retrieve from population class data storage 145 the census data for the city specified in the set of original address data. As another example, in some cases where the set of original address data includes a county attribute, address data manager 115 can use a county as the particular type of geographical region and, hence, retrieve from population class data storage 145 the census data for the country specified in the set of original address data.

After identifying the census data for the particular type of geographical region described in the set of original address data, address data manager 115 accesses population class data storage 145 to identify a table of mappings between population classes and ranges of population values defined for the particular type of geographical region. For instance, in some cases where address data manager 115 uses a city as the particular type of geographical region, address data manager 115 can retrieve from population class data storage 145 a table of mappings between population classes and ranges of population values defined for cities. As another example, in some cases where address data manager 115 uses a county as the particular type of geographical region, address data manager 115 may retrieves from population class data storage 145 a table of mappings between population classes and ranges of population values defined for counties. Based on the table of mappings and the identified census data, address data manager 115 determines the population class associated with the set of original address data.

Next, address data manager 115 sends distance and angle manager 125 the population class and a request to determine a distance and an angle. When address data manager 115 receives the distance and angle from distance and angle manager 125, address data manager 115 determines a new set of geo-location coordinates based on the set of geo-location coordinates associated with the original address data, the distance, and the angle. In some embodiments, address data manager 115 determines the new set of geo-location coordinates using the following equations:

$$new_{lat} = \sin^{-1}(\sin(orig_{lat}) \times \cos(d) + \cos(orig_{lat}) \times \sin(d) \times \cos(a))$$

$$new_{long} = orig_{long}$$

$$new_{long} = \mod\left(\left(orig_{long} - \sin^{-1}\left(\frac{\sin(\alpha) \times \sin(d)}{\cos(new_{lat})}\right) + \pi\right) \cdot 2\pi\right) - \pi$$

where $orig_{lat}$ is the latitude coordinate associated with the set of original address data in radians, $orig_{long}$ is the longitude coordinate associated with the set of original address data in radians, d is the distance in radians determined by distance and angle manager 125, a is the angle in radians determined by distance and angle manager 125, $new_{lat}$ is the latitude coordinate associated with the new set of geo-location coordinates in radians, $new_{long}$ is the longitude coordinate associated with the new set of geo-location coordinates in radians. In cases where the set of geo-location coordinates associated with the set of original address data is in degrees, minutes, and seconds, address data manager 115 converts them to radians using known techniques. Address data manager 115 first calculates a value for $new_{lat}$ using the first equation. If the cosine of the value $new_{lat}$ is zero, address data manager 115 uses the second equation to calculate a value for $new_{long}$. Otherwise, address data manager 115 uses the third equation to calculate a value for $new_{long}$. After calculating the new set of geo-location coordinates, address data manager 115 can convert the radian values into values that conform to a World Geodetic System 84 (WGS84) standard. Then, address data manager 115 sends geocoding manager 120 the new set of geo-location coordinates and a request to determine a new set of address data describing a geographical location of a structure (e.g., a building, a house, an apartment, a condo, an office, etc.) or plot of land that is closest to the new set of geo-location coordinates. Address data manager 115 uses the new set of address data that address data manager 115 receives from geocoding manager 120 as the anonymized version of the original address data.

In some embodiments, address data manager 115 performs cleansing operations on the new set of address data. In some instances, address data manager 115 may convert the new set of address data into the same group of attributes (e.g., the same data model) used to store the set of original address data. For example, one data model may be configured to store a set of original address data in one single group (e.g., address: 350 5th Ave, New York N.Y. 10118). In this example, address data manager 115 would convert the new set of address data into one group. Another data model may be configured to store a set of original address data in two groups of attributes (e.g., street: 350 5th Ave and location: New York N.Y. 10118). For this example, address data manager 115 would convert the new set of address data into the same two groups of attributes. Yet another data model may be configured to store a set of original address data in four groups of attributes (e.g., street: 350 5th Ave, city: New York, region: NY, and postcode: 10118). In this example, address data manager 115 would convert the new set of address data into the same four groups of attributes.

In other instances, address data manager 115 may format the new set of address data so that it is in the same format as the set of original address data. For instance, if the set of original address data uses all capital letters, address data manager 115 would format the new set of address data to use all capital letters. As another example, if the set of original address data uses abbreviations for street name (e.g., avenue as ave., boulevard as blvd., street as st., etc.), address data manager 115 would format the new set of address data to use such abbreviations. Any number of additional and/or different formats may be employed in different embodiments. Once address data manager 115 finishes with anonymizing the address data, address data manger 115 sends the set of anonymized address data to application 105. Alternatively, or in conjunction with sending the data to application 105, address data manger 115 stores the set of anonymized address data in anonymized address data storage 140 for later retrieval.

In some embodiments, address data manager 115 can also handle requests from application 105 for anonymized address data. For example, address data manager 115 may receive a request from application 105 for a set of anonymized address data. In response to the request, address data manager 115 retrieves the set of anonymized address data from anonymized address data storage 140 and forwards it to application 105.

Geocoding manager 120 is configured to perform geocoding operations. For instance, geocoding manager 120 can receive from address data manager 115 a set of address data and a request to determine a set of geo-location coordinates (e.g., latitude and longitude) associated with the set of address data. In some embodiments, geocoding manager 120 determines the set of geo-location coordinates associated with the set of address data by accessing reference data in reference data storage 130 and generating a set of geo-location coordinates based on the set of address data and the reference data using a geocoding technique. The set of geo-location coordinates can include a latitude value and a longitude value specified in terms of an appropriate unit of measure (e.g., degrees, minutes, and seconds; decimal degrees; etc.). In some embodiments, the set of geo-location coordinates conform to a WGS84 standard. Geocoding manager 120 may convert the latitude value and the longitude value into radians in some instances. After determining the set of geo-location coordinates, geocoding manager 120 sends them to address data manager 115.

In some instances, geocoding manager 120 may receive from address data manager 115 a set of geo-location coordinates and a request to determine a set of address data describing a geographical location of a structure (e.g., a building, a house, an apartment, a condo, an office, etc.) or plot of land that is closest to the set of geo-location coordinates. In response to the request, geocoding manager 120 determines the set of address data by accessing reference data in reference data storage 130 and generating a set of address data based on the set of geo-location coordinates and the reference data using a reverse geocoding technique. Once geocoding manager 120 determines the set of address data, geocoding manager 120 sends them to address data manager 115.

Distance and angle manager 125 handles the determination of distances and angles. For example, distance and angle manager 125 may receive from address data manager 115 a population class and a request to determine a distance and an angle. As explained above, population class data storage 145 may store tables of mappings between population classes and maximum distance value. In some embodiments, distance and angel manager 125 determines a distance by accessing population class data storage 145 and identifying a table of mappings between population classes and maximum distance values defined for the particular type of geographical region for which the population class is specified. For example, if the population class is specified for a city, distance and angle manager 125 identifies a table of mappings between population classes and maximum distance values defined for cities.

Next, distance and angle manager 125 identifies a maximum distance value based on the population class and the identified table of mappings between population classes and maximum distance values. Distance and angle manager 125 then calculates a minimum distance value based on the identified maximum distance value. In some embodiments, distance and angle manager 125 calculates the minimum distance value by multiplying the identified maximum distance value by a defined percentage value (e.g., 0.1 (10%), 0.2 (20%), 0.5 (50%), etc.). One of ordinary skill in the art will recognize that different methodologies may be used to calculate a minimum distance value based on a maximum distance value. For instance, in some embodiments, distance and angle manager 125 may calculate the minimum distance value by subtracting a defined amount from the identified maximum distance value. Once the minimum distance value is calculated, distance and angle manager 125 randomly selects a distance value between the minimum distance value and the maximum distance value. Distance and angle manager 125 uses the selected distance value as the determined distance. In some embodiments, distance and angle manager 125 converts the selected distance value into radians. To determine an angle, distance and angle manager 125 can randomly select a number between zero and 360. In some embodiments, distance and angle manager 125 converts the selected angle value into radians. Finally, distance and angle manager 125 sends the determined distance and angle to address data manager 115.

Figure 2:
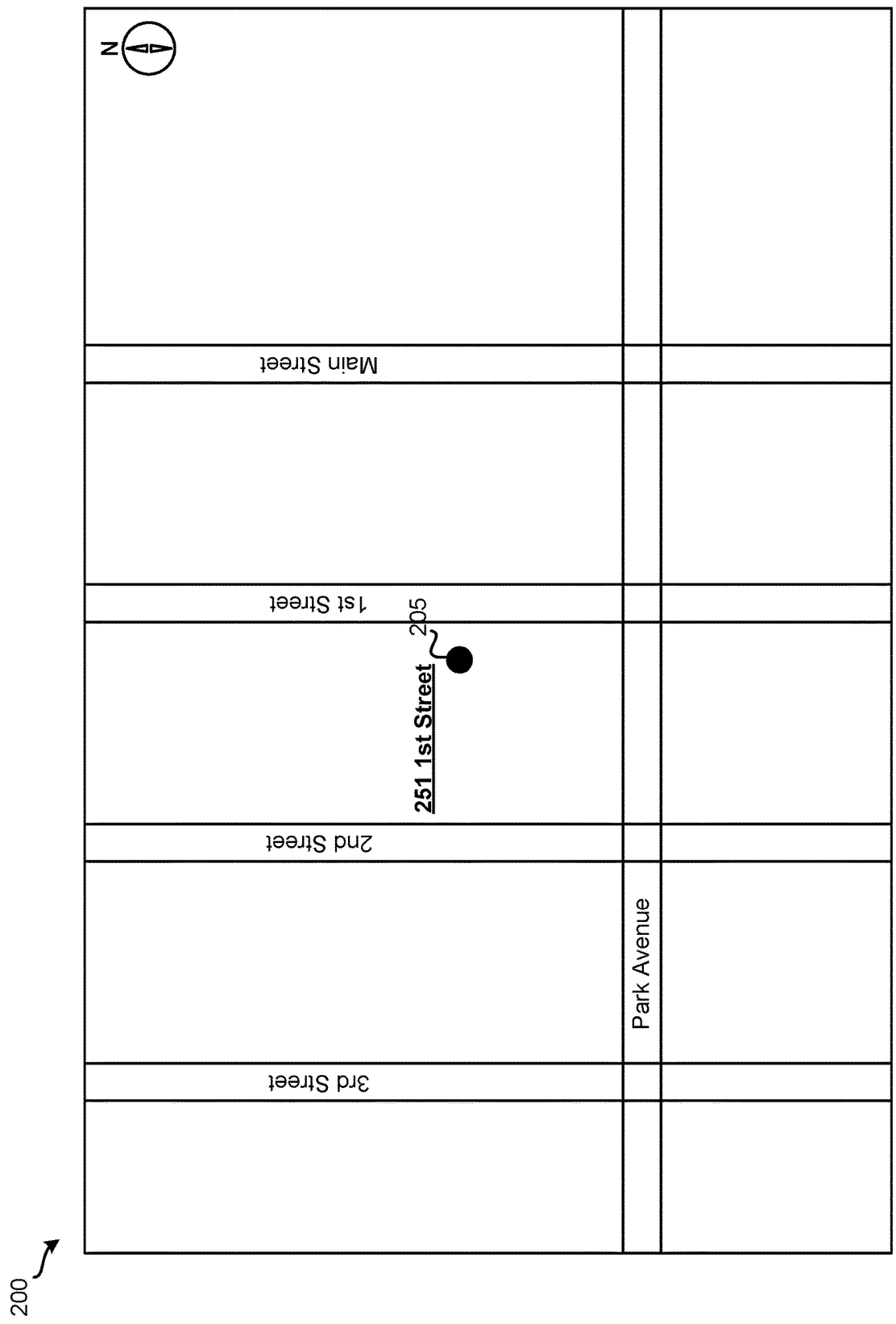
FIG. 2 illustrates an example map of a set of original address data according to some embodiments.
Figure 3:
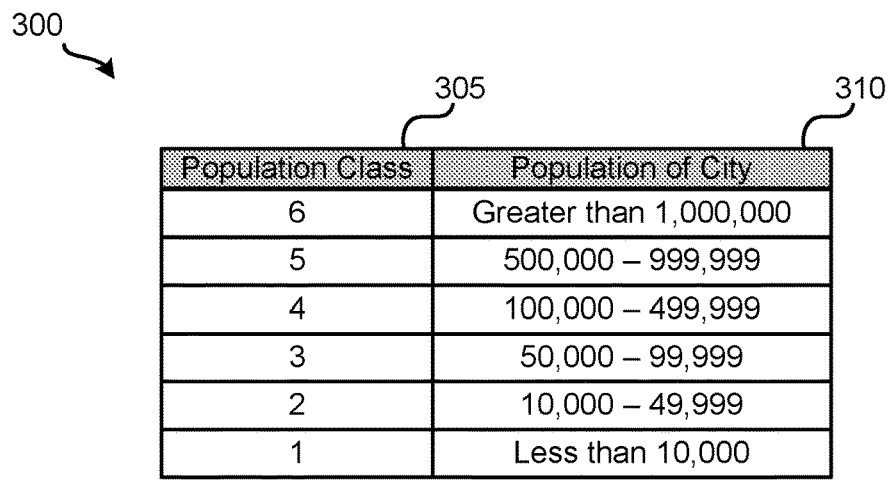
FIG. 3 illustrates an example table of mappings between population classes and ranges of population values according to some embodiments.
Figure 4:
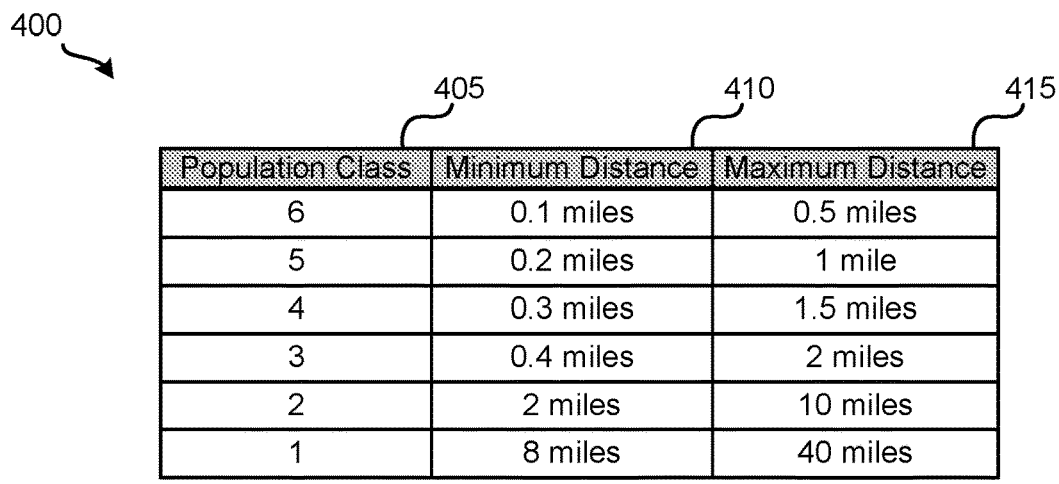
FIG. 4 illustrates an example map of a set of original address data according to some embodiments.

An example operation of system 100 will now be described by reference to FIGS. 2-7. Specifically, FIGS. 2 and 5-7 illustrate an example map for conceptually demonstrating anonymization of a set of address data according to some embodiments. FIGS. 3 and 4 illustrate example tables of mappings. The example operation starts by application 105 sending data processing system 110 a set of original address data and a request to anonymize the set of original address data. For this example, the set of original address data includes a street number of "251," a street of "1st Street," a city of "New City," a state of "New State," a zip code of "10101," and a country of "New America" (i.e., "251 1st Street, New city, New State, 10101, New America"). FIG. 2 illustrates an example map 200 of a set of original address data according to some embodiments. In particular, map 200 of FIG. 2 illustrates the location, represented by a black dot 205 along 1st Street, described by the set of original address data used in this example.

When address data manager 115 receives the set of original address data and the request from application 105, address data manager 115 sends geocoding manager 120 the set of original address data along with a request to determine a set of geo-location coordinates associated with the set of original address data. Upon receiving the set of original address data and the request from address data manager 115, geocoding manager 120 determines the set of geo-location coordinates associated with the set of original address data by accessing reference data in reference data storage 130 and generating a set of geo-location coordinates based on the set of address data and the reference data using a geocoding technique. Geocoding manager 120 then converts the latitude value and the longitude value into radians and sends them to address data manager 115.

Once address data manager 115 receives the set of geo-location coordinates associated with the set of original address data from geocoding manager 120, address data manager 115 determines a population class associated with the set of original address data. Address data manager 115 determines the population class associated with the set of original address data by first accessing population class data storage 145 and identifying the census data for the city of "New City," as specified in the set of original address data. For this example, the census data identified for "New City" indicates a population of 1,674,831. Next, address data manager 115 accesses population class data storage 145 to identify a table of mappings between population classes and ranges of population values defined for the same type of geographical region as the census data. Since the census data in this example is for a city, address data manager 115 identify a table of mappings between population classes and ranges of population values defined for cities.

FIG. 3 illustrates an example table 300 of mappings between population classes and ranges of population values according to some embodiments. Specifically, table 300 is a table of mappings between population classes and ranges of population values defined for cities. As shown in FIG. 3, table 300 includes six records with values stored in columns 305 and 310. Column 305 is configured to store a population class value. As described above, in some embodiments, a population class is a unique identifier that represents a particular range of population values. Column 310 is configured to store a range of population values that is mapped to the corresponding population class. For this example, a population range of greater than 1,000,000 maps to a population class of 6, a population range of 500,000-999,999 maps to a population class of 5, a population range of 100,000-499,999 maps to a population class of 4, a population range of 50,000-99,999 maps to a population class of 3, a population range of 10,000-49,999 maps to a population class of 2, and a population range of less than 10,000 maps to a population class of 1. Based on table 300 and the census data of 1,674,831 for the city of New City, address data manager 115 determines the population class associated with the set of original address data to be 6 since the census data of 1, 674,831 is between greater than 1,000,000, which maps to population class 6 according to table 300.

Next, address data manager 115 sends distance and angle manager 125 the population class and a request to determine a distance and an angle. Upon receiving the population class and the request, distance and angel manager 125 determines a distance by accessing population class data storage 145 and identifying a table of mappings between population classes and maximum distance values defined for cities, which is the type of geographical region for which the population class is specified. FIG. 4 illustrates an example table 400 of mappings between population classes, minimum distance values, and maximum distance values according to some embodiments. In particular, table 400 is a table of mappings between population classes, minimum distance values, and maximum distance values defined for cities. As shown in FIG. 4, table 400 includes six records with values stored in columns 405-415. Column 405 is configured to store a population class value. Column 410 is configured to store a minimum distance value that is mapped to the corresponding population class. Column 415 is configured to store a maximum distance value that is mapped to the corresponding population class. In this example, a minimum distance value of 0.1 miles and a maximum distance value of 0.5 miles maps to a population class of 6, a minimum distance value of 0.2 miles and a maximum distance value of 1 mile maps to a population class of 5, a minimum distance value of 0.3 miles and a maximum distance value of 1.5 miles maps to a population class of 4, a minimum distance value of 0.4 miles and a maximum distance value of 2 miles maps to a population class of 3, a minimum distance value of 2 miles and a maximum distance value of 10 miles maps to a population class of 2, and a minimum distance value of 8 miles and a maximum distance value of 40 miles maps to a population class of 1. One of ordinary skill in the art will recognize that different units of length may be used in different embodiments. For example, kilometers may be used in some embodiments instead of miles.

Figure 5:
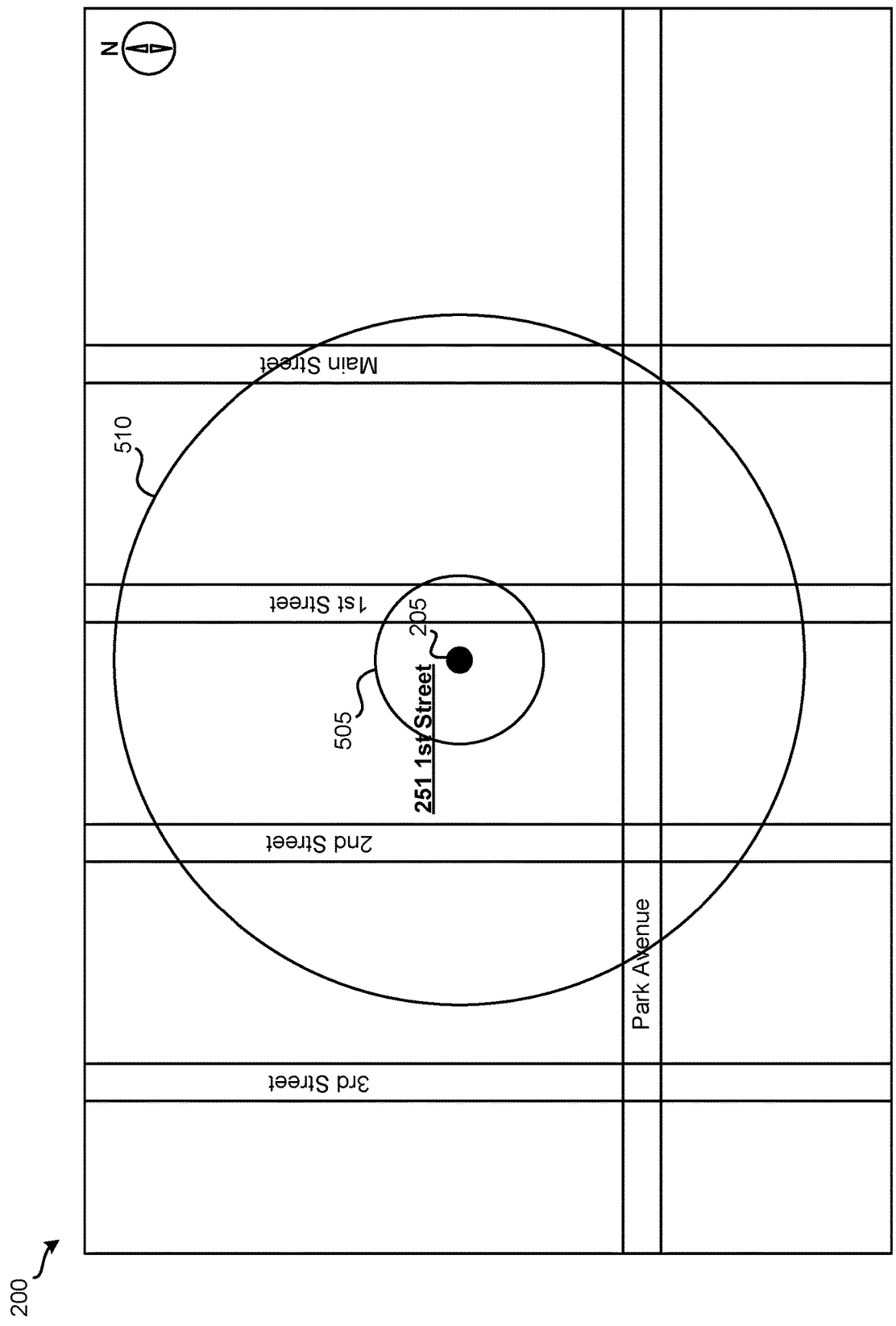
FIG. 5 illustrates the example map illustrated in FIG. 2 with minimum and maximum distance values depicted according to some embodiments.

Based on table 400 and a population class of 6, distance and angle manager 125 identifies a minimum distance value of 0.1 miles and a maximum distance value of 0.5 miles. FIG. 5 illustrates the example map illustrated in FIG. 2 with minimum and maximum distance values depicted according to some embodiments. As shown in FIG. 5, map 200 includes a circle 505 that represents a minimum distance value of 0.1 miles from the location described by the set of original address data. Map 200 in FIG. 5 also includes a circle 510 that represents a maximum distance value of 0.5 miles from the location described by the set of original address data. The example operation uses a table of mappings between population classes, minimum distance values, and maximum distance values for the purples of illustration and explanation. In some embodiments, tables of mappings between population classes and maximum distance values may be used since distance and angle manager 125 can calculate a minimum distance value based on a maximum distance value, as that described above by reference to FIG. 1. For this example operation of system 100, the minimum distance values are already calculated and stored in table 400.

After identifying the minimum and maximum distance values, distance and angle manager 125 randomly selects a distance value between the minimum distance value and the maximum distance value. For this example, distance and angle manager 125 selects the distance to be 0.84. Distance and angle manager 125 then converts the selected distance value into radians and uses the converted distance value as the determined distance. Next, distance and angle manager 125 determines an angle by randomly selecting a number between zero and 360. In this example, distance and angle manager 125 selects 119. Then, distance and angle manager 125 converts the selected angle value into radians. Distance and angle manager 125 then sends the determined distance and angle to address data manager 115.

Figure 6:
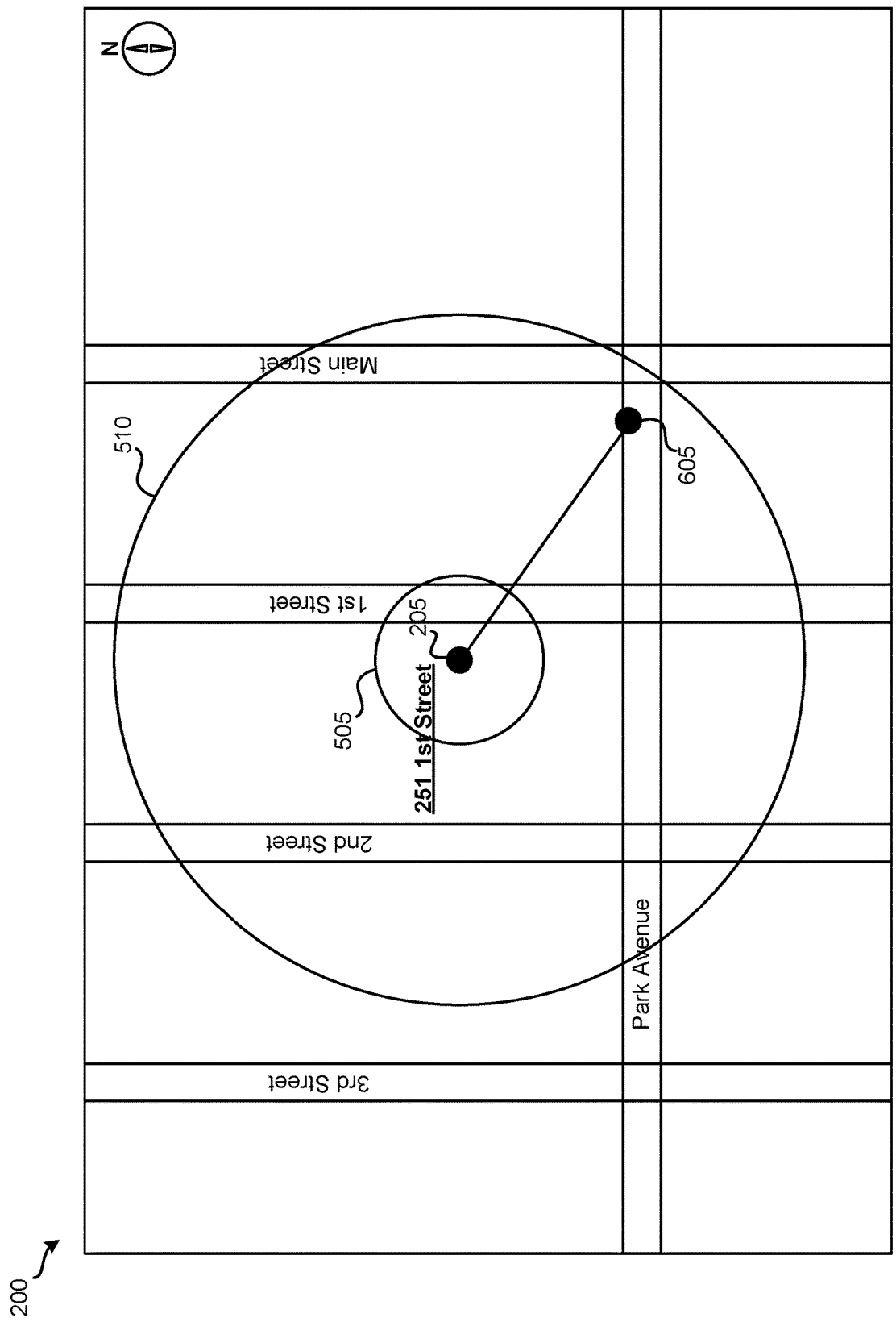
FIG. 6 illustrates the example map illustrated in FIG. 5 with a new location determined based on a distance, an angle, and an original location according to some embodiments.

When address data manager 115 receives the distance and angle from distance and angle manager 125, address data manager 115 converts the set of geo-location coordinates associated with the set of original address data that address data manager 115 received from geocoding manager 120 to radians. Then, address data manager 115 determines a new set of geo-location coordinates based on the set of geo-location coordinates associated with the original address data, the distance, and the angle by using the equations in the same manner describe above by reference to FIG. 1. FIG. 6 illustrates the example map illustrated in FIG. 5 with a new location determined based on a distance, an angle, and an original location according to some embodiments. As shown in FIG. 6, map 200 includes a black dot 605 that represents the new location that is determined based on a distance value of 0.84, an angle of 119, and the original location represented by black dot 205.

Figure 7:
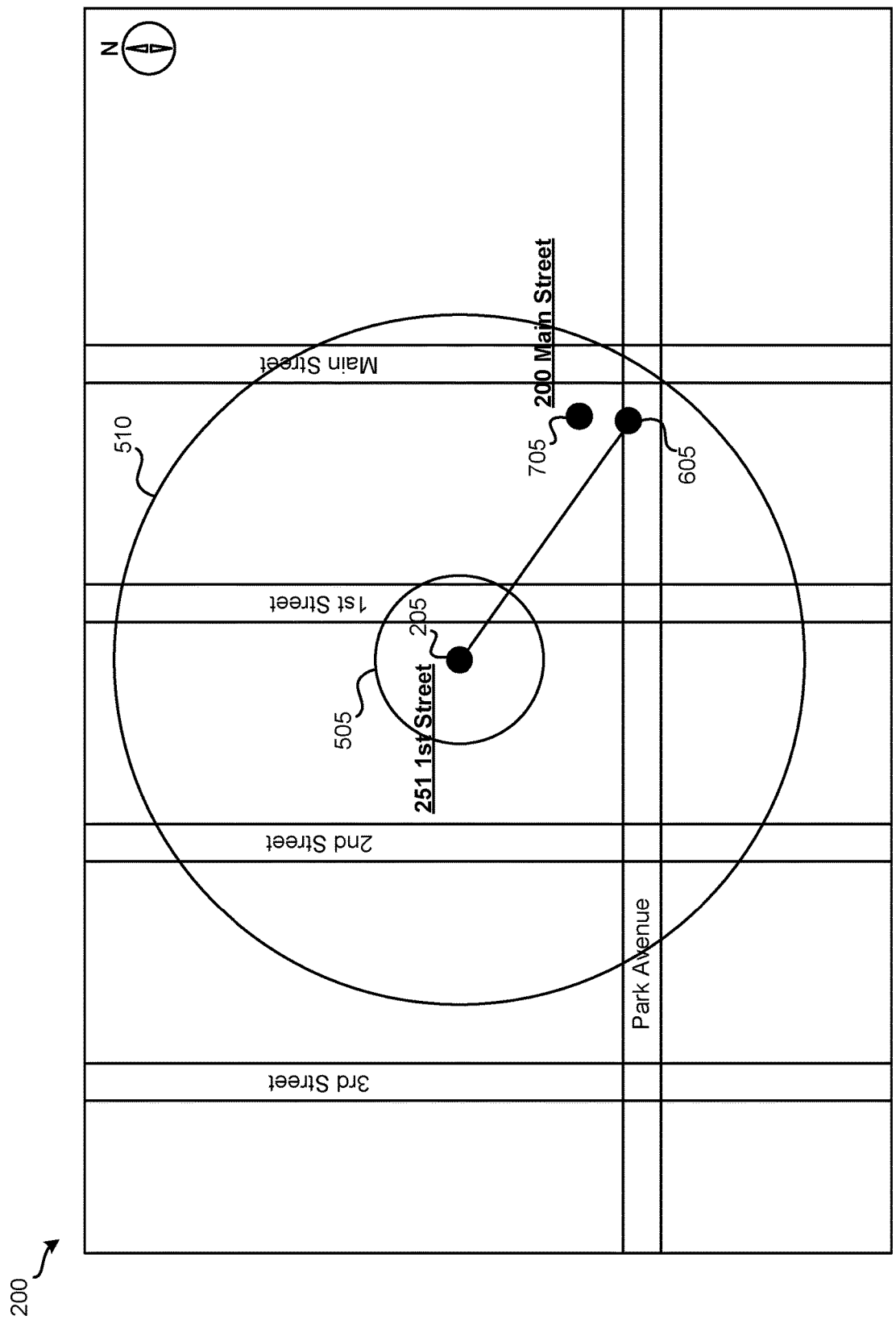
FIG. 7 illustrates the example map illustrated in FIG. 6 with an anonymized set of address data according to some embodiments.

After calculating the new set of geo-location coordinates, address data manager 115 may convert the radian values into values that conform to a WGS84 standard. Address data manager 115 then sends geocoding manager 120 the new set of geo-location coordinates and a request to determine a new set of address data describing a geographical location of a structure (e.g., a building, a house, an apartment, a condo, an office, etc.) or plot of land that is closest to the new set of geo-location coordinates. Once geocoding manager 120 receives the new set of geo-location coordinates and the request from address data manager 115, geocoding manager 120 determines the new set of address data by accessing reference data in reference data storage 130 and generating the new set of address data based on the set of geo-location coordinates and the reference data using a reverse geocoding technique. Then, geocoding manager 120 sends the new set of address data to address data manager 115. Address data manager 115 uses the new set of address data that address data manager 115 receives from geocoding manager 120 as the anonymized version of the original address data. In some embodiments, address data manger 115 sends the set of anonymized address data to application 105. Alternatively, or in conjunction with sending the data to application 105, address data manger 115 stores the set of anonymized address data in anonymized address data storage 140 for later retrieval. In this example, the new set of address data includes a street number of "20," a street of "Main Street," a city of "New City," a state of "New State," a zip code of "10101," and a country of "New America" (i.e., "200 Main Street, New City, New State, 10101, New America"). FIG. 7 illustrates the example map illustrated in FIG. 6 with an anonymized set of address data according to some embodiments. As shown in FIG. 7, map 200 includes a location, represented by a black dot 705 along Main Street, described by the new set of address data, which is an anonymized version of the original address data describing the original location represented by black dot 205.

FIG. 1 illustrates a data processing system that includes certain components (e.g., address data manager 115, geocoding manager 120, and distance and angle manager 125) and storages (e.g., reference data storage 130, original address data storage 135, anonymized address data storage 140, and population class data storage 145). One of ordinary skill in the art will understand that any of the operations described above by reference to FIG. 1 may be performed by a different component in different embodiments. For example, geocoding manager 120 (instead of address data manager 115) may determine population classes in some embodiments. As another example, distance and angle manager 125 (instead of address data manager 115) can convert a set of geo-location coordinates associated with a set of original address data to radians and determine a new set of geo-location coordinates based on the set of geo-location coordinates associated with the original address data, a distance, and an angle. Furthermore, one of ordinary skill in the art will appreciate that certain data in one of data storages 130-145 may be stored in another one of data storages 130-145 in some embodiments. For instance, census data for different types of geographical regions, tables of mappings between population classes and ranges of population values for different types of geographical regions, tables of mappings between population classes and maximum distance values, etc., that are described as being stored in population class data storage 145 can, in some embodiments, be stored in reference data storage 130.

Figure 8:
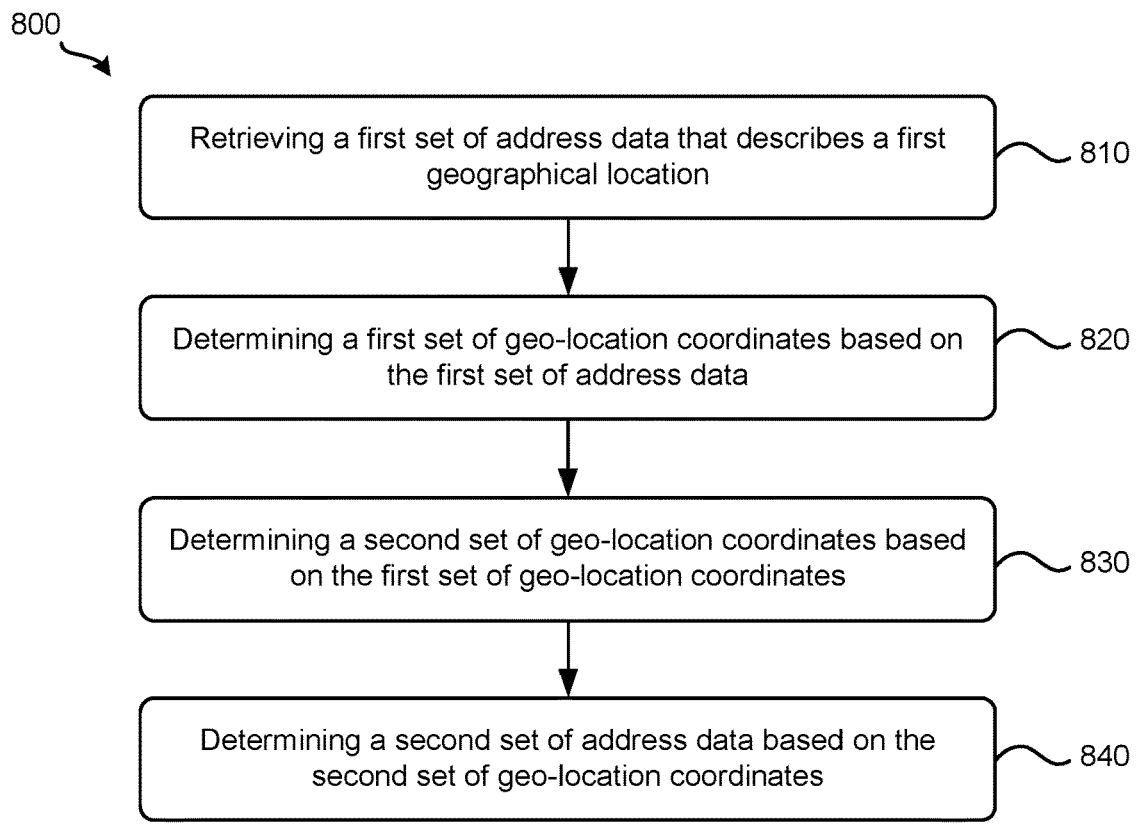
FIG. 8 illustrates a process for anonymizing address data according to some embodiments.

FIG. 8 illustrates a process 800 for anonymizing address data according to some embodiments. In some embodiments, data processing system 110 performs process 800 in response to a request to anonymize a set of address data. Process 800 begins by receiving, at 810, a first set of address data that describes a first geographic location. Referring to FIG. 1 as an example, address data manager 115 may receive a set of original address data and a request to anonymize the set of original address data from application 105.

Next, process 800 determines, at 820, a first set of geo-location coordinates based on the first set of address data. Referring to FIG. 1 and continuing with the example above, address data manager 115 can send geocoding manager 120 the set of original address data and a request to determine a set of geo-location coordinates associated with the set of original address data. When geocoding manager 120 receives them, geocoding manager 120 determines the set of geo-location coordinates associated with the set of original address data by accessing reference data in reference data storage 130 and generating a set of geo-location coordinates based on the set of address data and the reference data using a geocoding technique.

Process 800 then determines, at 830, a second set of geo-location coordinates based on the first set of geo-location coordinates. Referring to FIG. 1 and continuing with the example above, address data manager 115 may determine a population class associated with the set of original address data. Then, address data manager 115 requests distance and angle manager 125 to determine a distance and an angle based on the population class. Next, address data manger 115 determines a new set of geo-location coordinates (i.e., the second set of geo-location coordinates) based on the set of geo-location coordinates associated with the original address data, the distance, and the angle.

Finally, process 800 determines, at 840, a second set of address data based on the second set of geo-location coordinates. Referring to FIG. 1 and continuing with the example above, address data manager 115 can send geocoding manager 120 the new set of geo-location coordinates and a request to determine a new set of address data describing a geographical location of a structure (e.g., a building, a house, an apartment, a condo, an office, etc.) or plot of land that is closest to the new set of geo-location coordinates. Upon receiving the new set of geo-location coordinates and the request, geocoding manager 120 determines the new set of address data by accessing reference data in reference data storage 130 and generating the new set of address data based on the set of geo-location coordinates and the reference data using a reverse geocoding technique. Address data manager 115 uses the new set of address data that address data manager 115 receives from geocoding manager 120 as the anonymized version of the original address data.

The examples and embodiments described above by reference to FIGS. 1-8 discuss the processing of a single set of address data. One of ordinary skill in the art will understand that system 100 can process multiple sets of original address data. For instance, data processing system 110 may receive from application 105 a request to anonymize a table or database full of original address data. In response, data processing system 110 anonymizes the originally address data in the same or similar manner described above.

Additionally, the examples and embodiments described above discuss performing various operations based on a particular type of geographical region (e.g., identifying census data, identify a table of mappings between population classes and ranges of population values, identifying a table of mappings between population classes and maximum distance values, etc.). Specifically, the examples describe above use a city as the type of geographical region. One of ordinary skill in the art will appreciate that other types of geographical regions may be used for such operations in some embodiments.

Figure 9:
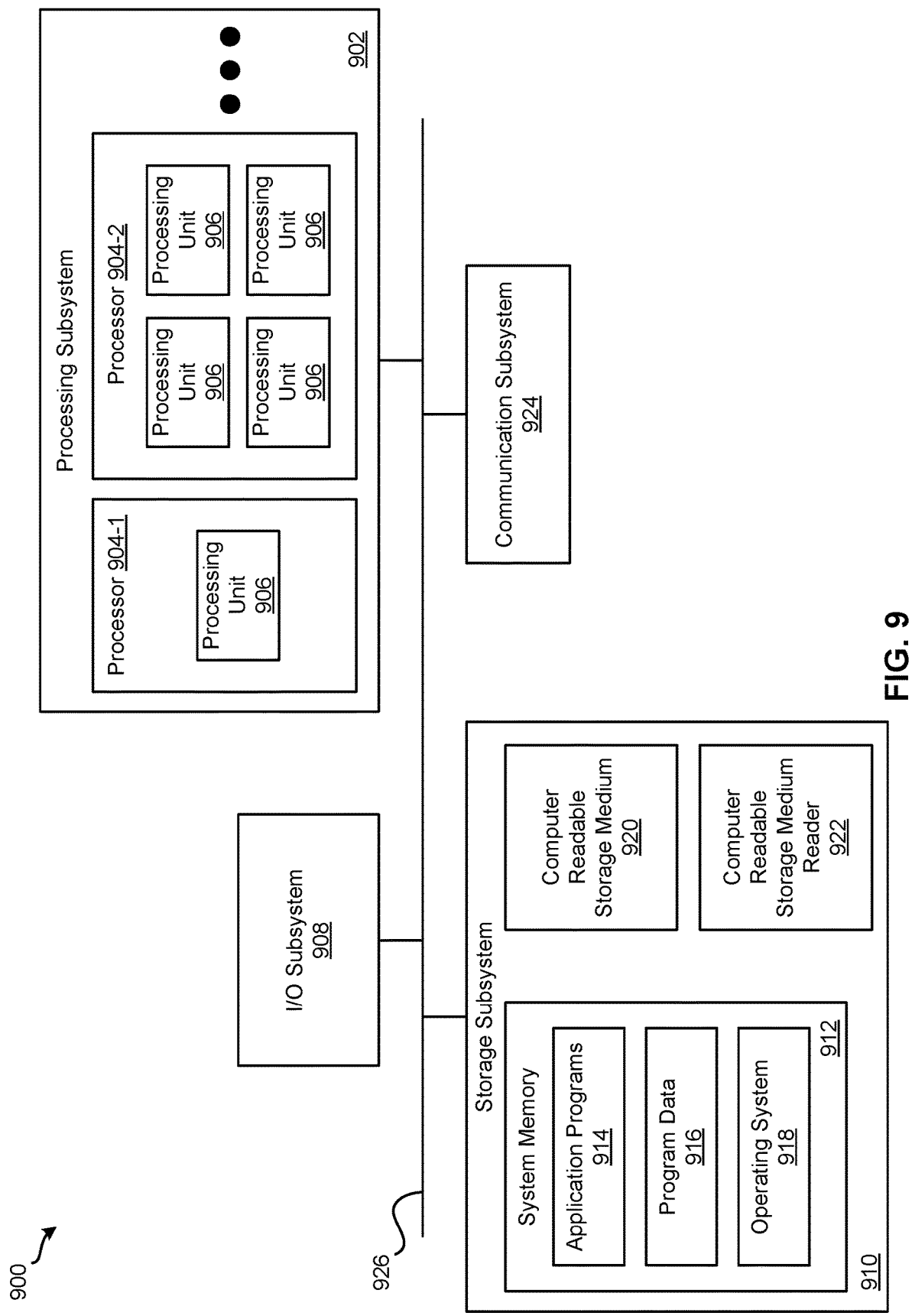
FIG. 9 illustrates an exemplary computer system, in which various embodiments may be implemented.

FIG. 9 illustrates an exemplary computer system 900 for implementing various embodiments described above. For example, computer system 900 may be used to implement system 100 or data processing system 110. Computer system 900 may be a desktop computer, a laptop, a server computer, or any other type of computer system or combination thereof. Some or all elements of application 105, address data manager 115, geocoding manager 120, distance and angle manager 125, or combinations thereof can be included or implemented in computer system 900. In addition, computer system 900 can implement many of the operations, methods, and/or processes described above (e.g., process 800). As shown in FIG. 9, computer system 900 includes processing subsystem 902, which communicates, via bus subsystem 926, with input/output (I/O) subsystem 908, storage subsystem 910 and communication subsystem 924.

Bus subsystem 926 is configured to facilitate communication among the various components and subsystems of computer system 900. While bus subsystem 926 is illustrated in FIG. 9 as a single bus, one of ordinary skill in the art will understand that bus subsystem 926 may be implemented as multiple buses. Bus subsystem 926 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 902, which can be implemented as one or more integrated circuits (e.g., a conventional microprocessor or microcontroller), controls the operation of computer system 900. Processing subsystem 902 may include one or more processors 904. Each processor 904 may include one processing unit 906 (e.g., a single core processor such as processor 904-1) or several processing units 906 (e.g., a multicore processor such as processor 904-2). In some embodiments, processors 904 of processing subsystem 902 may be implemented as independent processors while, in other embodiments, processors 904 of processing subsystem 902 may be implemented as multiple processors integrate into a single chip or multiple chips. Still, in some embodiments, processors 904 of processing subsystem 902 may be implemented as a combination of independent processors and multiple processors integrated into a single chip or multiple chips.

In some embodiments, processing subsystem 902 can execute a variety of programs or processes in response to program code and can maintain multiple concurrently executing programs or processes. At any given time, some or all of the program code to be executed can reside in processing subsystem 902 and/or in storage subsystem 910. Through suitable programming, processing subsystem 902 can provide various functionalities, such as the functionalities described above by reference to process 800, etc.

I/O subsystem 908 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 900 to a user or another device (e.g., a printer).

As illustrated in FIG. 9, storage subsystem 910 includes system memory 912, computer-readable storage medium 920, and computer-readable storage medium reader 922. System memory 912 may be configured to store software in the form of program instructions that are loadable and executable by processing subsystem 902 as well as data generated during the execution of program instructions. In some embodiments, system memory 912 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 912 may include different types of memory, such as static random access memory (SRAM) and/or dynamic random access memory (DRAM). System memory 912 may include a basic input/output system (BIOS), in some embodiments, that is configured to store basic routines to facilitate transferring information between elements within computer system 900 (e.g., during start-up). Such a BIOS may be stored in ROM (e.g., a ROM chip), flash memory, or any other type of memory that may be configured to store the BIOS.

As shown in FIG. 9, system memory 912 includes application programs 914 (e.g., application 105), program data 916, and operating system (OS) 918. OS 918 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 920 may be a non-transitory computer-readable medium configured to store software (e.g., programs, code modules, data constructs, instructions, etc.). Many of the components (e.g., application 105, address data manager 115, geocoding manager 120, and distance and angle manager 125) and/or processes (e.g., process 800) described above may be implemented as software that when executed by a processor or processing unit (e.g., a processor or processing unit of processing subsystem 902) performs the operations of such components and/or processes. Storage subsystem 910 may also store data used for, or generated during, the execution of the software.

Storage subsystem 910 may also include computer-readable storage medium reader 922 that is configured to communicate with computer-readable storage medium 920.

Together and, optionally, in combination with system memory 912, computer-readable storage medium 920 may comprehensively represent remote, local, fixed, and/or removable storage devices plus storage media for temporarily and/or more permanently containing, storing, transmitting, and retrieving computer-readable information.

Computer-readable storage medium 920 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 924 serves as an interface for receiving data from, and transmitting data to, other devices, computer systems, and networks. For example, communication subsystem 924 may allow computer system 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 924 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 924 may provide components configured for wired communication (e.g., Ethernet) in addition to or instead of components configured for wireless communication.

One of ordinary skill in the art will realize that the architecture shown in FIG. 9 is only an example architecture of computer system 900, and that computer system 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
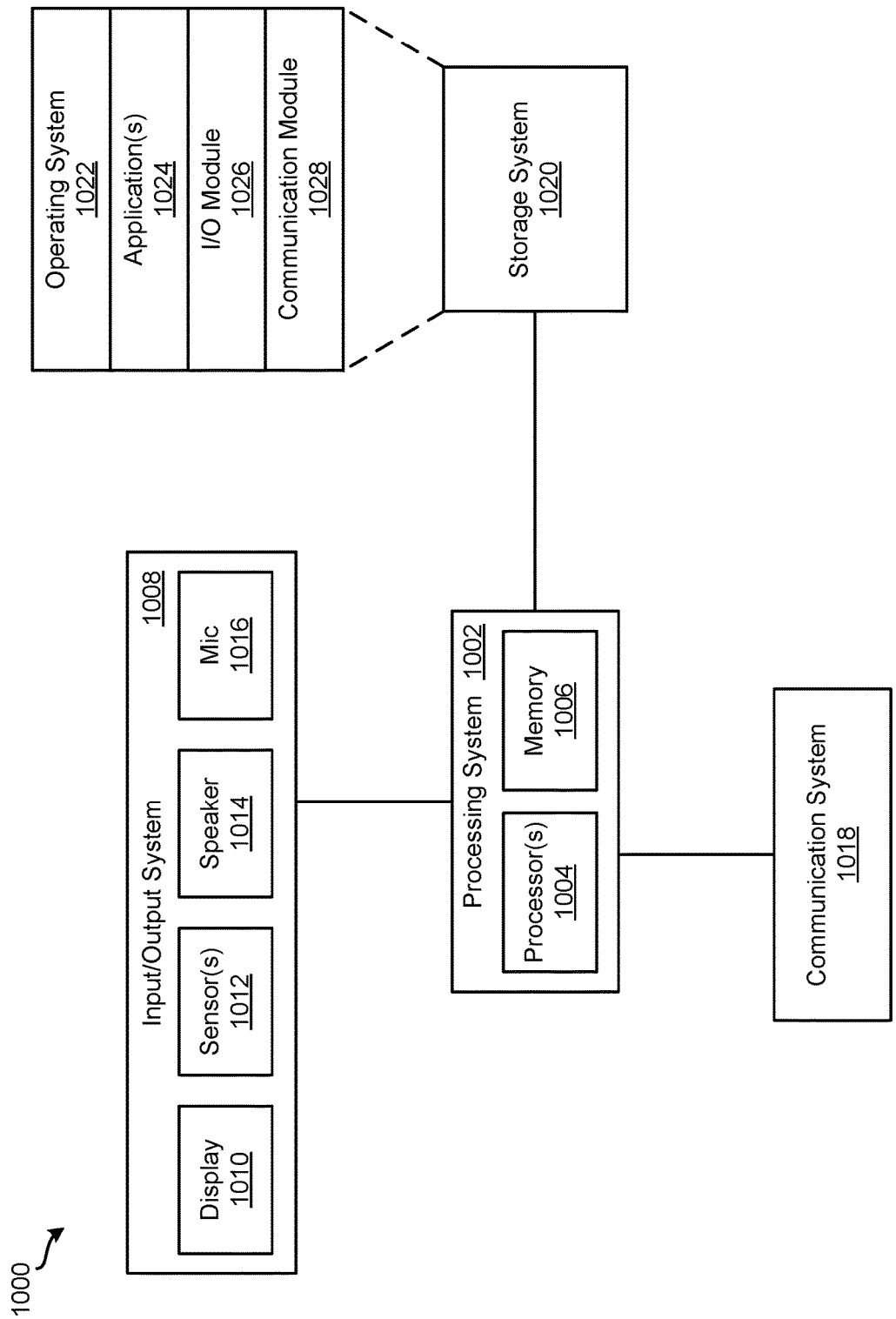
FIG. 10 illustrates an exemplary computing device, in which various embodiments may be implemented.

FIG. 10 illustrates an exemplary computing device 1000 for implementing various embodiments described above. For example, computing device 1000 may be used to implement a device on which application 105 operates (not shown). Computing device 1000 may be a cellphone, a smartphone, a wearable device, an activity tracker or manager, a tablet, a personal digital assistant (PDA), a media player, or any other type of mobile computing device or combination thereof. As shown in FIG. 10, computing device 1000 includes processing system 1002, input/output (I/O) system 1008, communication system 1018, and storage system 1020. These components may be coupled by one or more communication buses or signal lines.

Processing system 1002, which can be implemented as one or more integrated circuits (e.g., a conventional microprocessor or microcontroller), controls the operation of computing device 1000. As shown, processing system 1002 includes one or more processors 1004 and memory 1006. Processors 1004 are configured to run or execute various software and/or sets of instructions stored in memory 1006 to perform various functions for computing device 1000 and to process data.

Each processor of processors 1004 may include one processing unit (e.g., a single core processor) or several processing units (e.g., a multicore processor). In some embodiments, processors 1004 of processing system 1002 may be implemented as independent processors while, in other embodiments, processors 1004 of processing system 1002 may be implemented as multiple processors integrate into a single chip. Still, in some embodiments, processors 1004 of processing system 1002 may be implemented as a combination of independent processors and multiple processors integrated into a single chip.

Memory 1006 may be configured to receive and store software (e.g., operating system 1022, applications 1024, I/O module 1026, communication module 1028, etc. from storage system 1020) in the form of program instructions that are loadable and executable by processors 1004 as well as data generated during the execution of program instructions. In some embodiments, memory 1006 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1008 is responsible for receiving input through various components and providing output through various components. As shown for this example, I/O system 1008 includes display 1010, one or more sensors 1012, speaker 1014, and microphone 1016. Display 1010 is configured to output visual information (e.g., a graphical user interface (GUI) generated and/or rendered by processors 1004). In some embodiments, display 1010 is a touch screen that is configured to also receive touch-based input. Display 1010 may be implemented using liquid crystal display (LCD) technology, light-emitting diode (LED) technology, organic LED (OLED) technology, organic electro luminescence (OEL) technology, or any other type of display technologies. Sensors 1012 may include any number of different types of sensors for measuring a physical quantity (e.g., temperature, force, pressure, acceleration, orientation, light, radiation, etc.). Speaker 1014 is configured to output audio information and microphone 1016 is configured to receive audio input. One of ordinary skill in the art will appreciate that I/O system 1008 may include any number of additional, fewer, and/or different components. For instance, I/O system 1008 may include a keypad or keyboard for receiving input, a port for transmitting data, receiving data and/or power, and/or communicating with another device or component, an image capture component for capturing photos and/or videos, etc.

Communication system 1018 serves as an interface for receiving data from, and transmitting data to, other devices, computer systems, and networks. For example, communication system 1018 may allow computing device 1000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1018 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1018 may provide components configured for wired communication (e.g., Ethernet) in addition to or instead of components configured for wireless communication.

Storage system 1020 handles the storage and management of data for computing device 1000. Storage system 1020 may be implemented by one or more non-transitory machine-readable mediums that are configured to store software (e.g., programs, code modules, data constructs, instructions, etc.) and store data used for, or generated during, the execution of the software.

In this example, storage system 1020 includes operating system 1022, one or more applications 1024, I/O module 1026, and communication module 1028. Operating system 1022 includes various procedures, sets of instructions, software components and/or drivers for controlling and managing general system tasks (e.g., memory management, storage device control, power management, etc.) and facilitates communication between various hardware and software components. Operating system 1022 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1024 can include any number of different applications installed on computing device 1000. For example, application 105 may be installed on computing device 1000. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1026 manages information received via input components (e.g., display 1010, sensors 1012, and microphone 1016) and information to be outputted via output components (e.g., display 1010 and speaker 1014). Communication module 1028 facilitates communication with other devices via communication system 1018 and includes various software components for handling data received from communication system 1018.

One of ordinary skill in the art will realize that the architecture shown in FIG. 10 is only an example architecture of computing device 1000, and that computing device 1000 may have additional or fewer components than shown, or a different configuration of components. The various components shown in FIG. 10 may be implemented in hardware, software, firmware or any combination thereof, including one or more signal processing and/or application specific integrated circuits.

Figure 11:
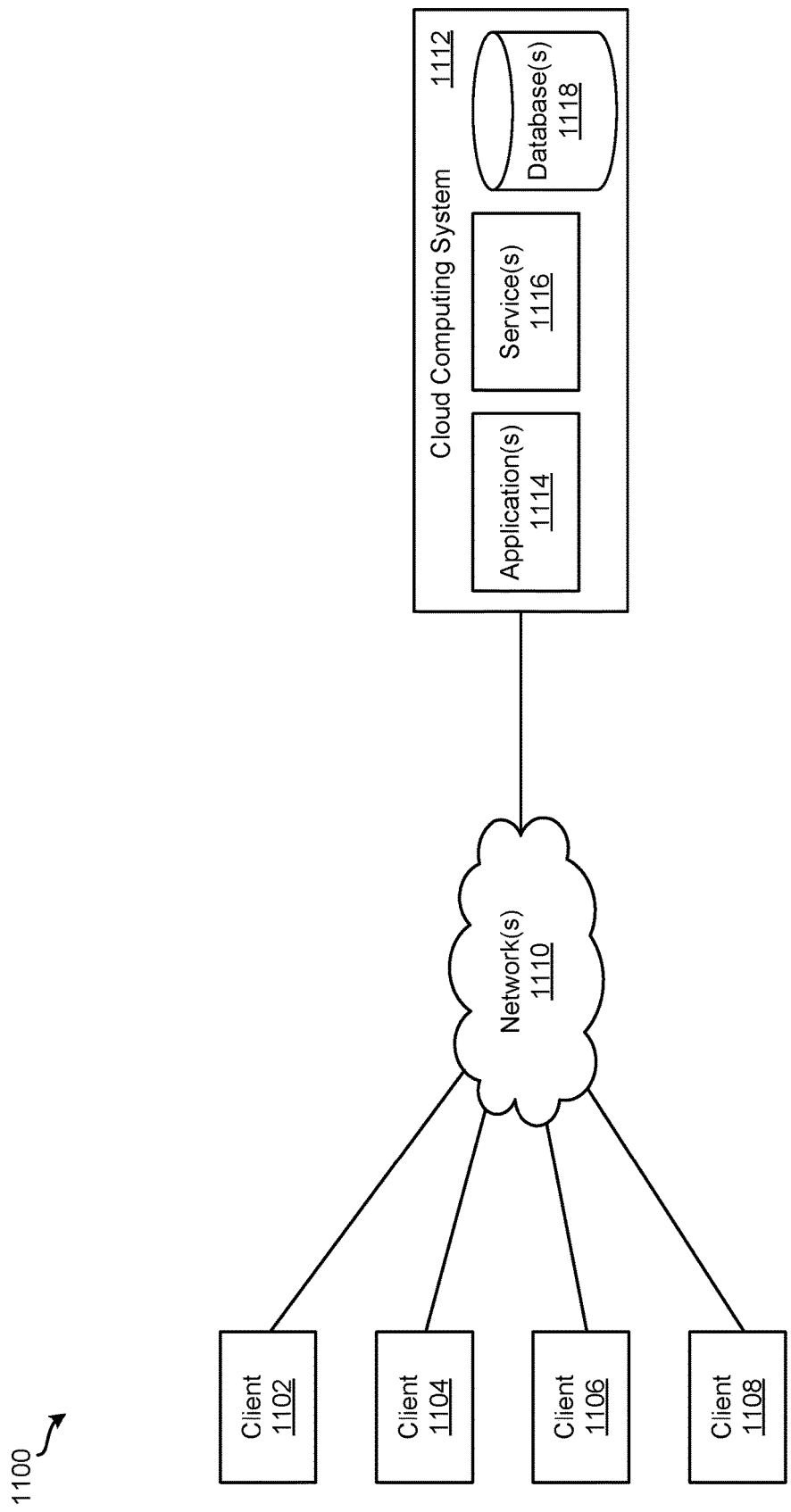
FIG. 11 illustrates system for implementing various embodiments described above.

FIG. 11 illustrates an exemplary system 1100 for implementing various embodiments described above. For example, cloud computing system 1112 of system 1100 may be used to implement data processing system 110 and one of client devices 1102-1108 may be used to implement a device on which application 105 operates (not shown). As shown, system 1100 includes client devices 1102-1108, one or more networks 1110, and cloud computing system 1112. Cloud computing system 1112 is configured to provide resources and data to client devices 1102-1108 via networks 1110. In some embodiments, cloud computing system 1100 provides resources to any number of different users (e.g., customers, tenants, organizations, etc.). Cloud computing system 1112 may be implemented by one or more computer systems (e.g., servers), virtual machines operating on a computer system, or a combination thereof.

As shown, cloud computing system 1112 includes one or more applications 1114, one or more services 1116, and one or more databases 1118. Cloud computing system 1100 may provide applications 1114, services 1116, and databases 1118 to any number of different customers in a self-service, subscription-based, elastically scalable, reliable, highly available, and secure manner.

In some embodiments, cloud computing system 1100 may be adapted to automatically provision, manage, and track a customer's subscriptions to services offered by cloud computing system 1100. Cloud computing system 1100 may provide cloud services via different deployment models. For example, cloud services may be provided under a public cloud model in which cloud computing system 1100 is owned by an organization selling cloud services and the cloud services are made available to the general public or different industry enterprises. As another example, cloud services may be provided under a private cloud model in which cloud computing system 1100 is operated solely for a single organization and may provide cloud services for one or more entities within the organization. The cloud services may also be provided under a community cloud model in which cloud computing system 1100 and the cloud services provided by cloud computing system 1100 are shared by several organizations in a related community. The cloud services may also be provided under a hybrid cloud model, which is a combination of two or more of the aforementioned different models.

In some instances, any one of applications 1114, services 1116, and databases 1118 made available to client devices 1102-1108 via networks 1110 from cloud computing system 1100 is referred to as a "cloud service." Typically, servers and systems that make up cloud computing system 1100 are different from the on-premises servers and systems of a customer. For example, cloud computing system 1100 may host an application and a user of one of client devices 1102-1108 may order and use the application via networks 1110.

Applications 1114 may include software applications that are configured to execute on cloud computing system 1112 (e.g., a computer system or a virtual machine operating on a computer system) and be accessed, controlled, managed, etc. via client devices 1102-1108. In some embodiments, applications 1114 may include server applications and/or mid-tier applications (e.g., HTTP (hypertext transport protocol) server applications, FTP (file transfer protocol) server applications, CGI (common gateway interface) server applications, JAVA server applications, etc.). Services 1116 are software components, modules, application, etc. that are configured to execute on cloud computing system 1112 and provide functionalities to client devices 1102-1108 via networks 1110. Services 1116 may be web-based services or on-demand cloud services.

Databases 1118 are configured to store and/or manage data that is accessed by applications 1114, services 1116, and/or client devices 1102-1108. For instance, storages 130-145 may be stored in databases 1118. Databases 1118 may reside on a non-transitory storage medium local to (and/or resident in) cloud computing system 1112, in a storage-area network (SAN), on a non-transitory storage medium local located remotely from cloud computing system 1112. In some embodiments, databases 1118 may include relational databases that are managed by a relational database management system (RDBMS). Databases 1118 may be a column-oriented databases, row-oriented databases, or a combination thereof. In some embodiments, some or all of databases 1118 are in-memory databases. That is, in some such embodiments, data for databases 1118 are stored and managed in memory (e.g., random access memory (RAM)).

Client devices 1102-1108 are configured to execute and operate a client application (e.g., a web browser, a proprietary client application, etc.) that communicates with applications 1114, services 1116, and/or databases 1118 via networks 1110. This way, client devices 1102-1108 may access the various functionalities provided by applications 1114, services 1116, and databases 1118 while applications 1114, services 1116, and databases 1118 are operating (e.g., hosted) on cloud computing system 1100. Client devices 1102-1108 may be computer system 900 or computing device 1000, as described above by reference to FIGS. 9 and 10, respectively. Although system 1100 is shown with four client devices, any number of client devices may be supported.

Networks 1110 may be any type of network configured to facilitate data communications among client devices 1102-1108 and cloud computing system 1112 using any of a variety of network protocols. Networks 1110 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
    receiving, from an application, a first set of address data that describes a first geographic location and a request to anonym ize the first set of address data;
    determining a first set of geo-location coordinates of the first geographic location based on the first set of address data;
    determining a population class associated with the first set of address data;
    determining a distance value based on the population class associated with the first set of address data;
    determining a second set of geo-location coordinates based on the first set of geolocation coordinates and the distance value;
    based on the second set of geo-location coordinates, determining a second set of address data that describes a second geographical location as an anonymized version of the first set of address data; and
    sending the second set of address data to the application.

2. The non-transitory machine-readable medium of claim 1, wherein determining the population class associated with the first set of address data comprises identifying a table of mappings between a plurality of population classes and a plurality of population ranges, wherein determining the population class associated with the first set of address data is based on the table of mappings.

3. The non-transitory machine-readable medium of claim 1, wherein determining the distance value comprises:
    identifying a table of mappings between a plurality of population classes and a plurality of maximum distance values; and
    determining the minimum distance value is based on the maximum distance value; and randomly selecting a number between the minimum distance value and the maximum distance value as the distance value.

4. The non-transitory machine-readable medium of claim 1, wherein the program further comprises a set of instructions for determining an angle, wherein determining the second set of geo-location coordinates is further based on the angle.

5. The non-transitory machine-readable medium of claim 1, wherein determining the second set of address data comprises performing a set of reverse geocoding operations to identify a set of address data that describes a geographic location nearest to the second set of geo-location coordinates as the second set of address data.

6. A method comprising:
    receiving, from an application, a first set of address data that describes a first geographic location and a request to anonymize the first set of address data;
    determining a first set of geo-location coordinates of the first geographic location based on the first set of address data;
    determining a population class associated with the first set of address data;
    determining a distance value based on the population class associated with the first set of address data;
    determining a second set of geo-location coordinates based on the first set of geolocation coordinates and the distance value;
    based on the second set of geo-location coordinates, determining a second set of address data that describes a second geographical location as an anonymized version of the first set of address data; and
    sending the second set of address data to the application.

7. The method of claim 6, wherein determining the population class associated with the first set of address data comprises identifying a table of mappings between a plurality of population classes and a plurality of population ranges, wherein determining the population class associated with the first set of address data is based on the table of mappings.

8. The method of claim 6, wherein determining the distance value comprises:

identifying a table of mappings between a plurality of population classes and a plurality of maximum distance values; and determining the minimum distance value is based on the maximum distance value; and randomly selecting a number between the minimum distance value and the maximum distance value as the distance value.

9. The method of claim 6 further comprising determining an angle, wherein determining the second set of geo-location coordinates is further based on the angle.

10. The method of claim 6, wherein determining the second set of address data comprises performing a set of reverse geocoding operations to identify a set of address data that describes a geographic location nearest to the second set of geo-location coordinates as the second set of address data.

11. A system comprising:
a set of processing units; and
a non-transitory machine-readable medium storing instructions that when executed by at least one processing unit in the set of processing units cause the at least one processing unit to:
receive, from an application, a first set of address data that describes a first geographic location and a request to anonymize the first set of address data;
determine a first set of geo-location coordinates of the first geographic location based on the first set of address data;
determine a population class associated with the first set of address data;
determine a distance value based on the population class associated with the first set of address data;
determine a second set of geo-location coordinates based on the first set of geolocation coordinates and the distance value;
based on the second set of geo-location coordinates, determine a second set of address data that describes a second geographical location as an anonymized version of the first set of address data; and
send the second set of address data to the application.

12. The system of claim 11, wherein determining the population class associated with the first set of address data comprises identifying a table of mappings between a plurality of population classes and a plurality of population ranges, wherein determining the population class associated with the first set of address data is based on the table of mappings.

13. The system of claim 11, wherein determining the distance value comprises:
identifying a table of mappings between a plurality of population classes and a plurality of maximum distance values; and
determining the minimum distance value is based on the maximum distance value; and randomly selecting a number between the minimum distance value and the maximum distance value as the distance value.

14. The system of claim 11, wherein the instructions further cause the at least one processing unit to determine an angle, wherein determining the second set of geolocation coordinates is further based on the angle.

15. The non-transitory machine-readable medium of claim 1, wherein the program further comprises a set of instructions for converting the second set of address data into a third set of address data that conforms to a data model associated with the first set of address data.

16. The non-transitory machine-readable medium of claim 1, wherein the program further comprises a set of instructions for formatting the second set of address data using a format of the first set of address data.

17. The method of claim 6 further comprising converting the second set of address data into a third set of address data that conforms to a data model associated with the first set of address data.

18. The method of claim 6 further comprises formatting the second set of address data using a format of the first set of address data.

19. The system of claim 11, wherein the instructions further cause the at least one processing unit to convert the second set of address data into a third set of address data that conforms to a data model associated with the first set of address data.

20. The system of claim 11, wherein the instructions further cause the at least one processing unit to format the second set of address data using a format of the first set of address data.

* * * * *